(12) United States Patent
Seleznev et al.

(10) Patent No.: US 9,898,588 B2
(45) Date of Patent: Feb. 20, 2018

(54) METHOD AND APPARATUS FOR PROVIDING CLOUD-BASED DIGITAL RIGHTS MANAGEMENT SERVICE AND SYSTEM THEREOF

(71) Applicant: Samsung Electronics Co., Ltd., Gyeonggi-do (KR)

(72) Inventors: Sergey Nikolayevich Seleznev, Gyeonggi-do (KR); Byung-Rae Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 13/724,419

(22) Filed: Dec. 21, 2012

(65) Prior Publication Data

US 2013/0167253 A1 Jun. 27, 2013

(30) Foreign Application Priority Data

Dec. 21, 2011 (KR) .................. 10-2011-0139462

(51) Int. Cl.
*G06F 21/00* (2013.01)
*G06F 21/10* (2013.01)

(52) U.S. Cl.
CPC .................. *G06F 21/10* (2013.01)

(58) Field of Classification Search
CPC .......... G06F 21/10; G06F 21/31; G06F 21/60; H04L 63/10; H04L 65/4084
See application file for complete search history.

(56) References Cited

U.S. PATENT DOCUMENTS

| | | | |
|---|---|---|---|
| 2008/0082448 A1 | 4/2008 | Meijer et al. | |
| 2008/0091613 A1 | 4/2008 | Gates et al. | |
| 2008/0195546 A1* | 8/2008 | Lilley | 705/59 |
| 2009/0183010 A1 | 7/2009 | Schnell et al. | |
| 2010/0138928 A1* | 6/2010 | Lee et al. | 726/26 |
| 2010/0250389 A1* | 9/2010 | Augustin et al. | 705/26 |
| 2011/0087603 A1 | 4/2011 | Garcia et al. | |
| 2012/0084804 A1* | 4/2012 | Simmons | 725/28 |
| 2012/0227097 A1* | 9/2012 | Nakhjiri | 726/7 |
| 2013/0061291 A1* | 3/2013 | Hegg | G06F 21/33 726/4 |

* cited by examiner

*Primary Examiner* — Kendall Dolly
(74) *Attorney, Agent, or Firm* — The Farrell Law Firm, P.C.

(57) ABSTRACT

A method for providing a Digital Rights Management (DRM) service in a network is provided. The method includes receiving a request message for device registration, which includes DRM-related identification information, from a user device; and registering registration information of the user device, which is distinguished according to a corresponding user account and according to a corresponding DRM solution, based on the DRM-related identification information.

12 Claims, 5 Drawing Sheets

METHOD AND APPARATUS FOR PROVIDING CLOUD-BASED DIGITAL RIGHTS MANAGEMENT SERVICE AND SYSTEM THEREOF

PRIORITY

This application claims priority under 35 U.S.C. § 119(a) to a Korean Patent Application filed in the Korean Intellectual Property Office on Dec. 21, 2011 and assigned Serial No. 10-2011-0139462, the entire content of which is incorporated herein by reference.

BACKGROUND OF THE INVENTION

1. Field of the Invention

The present invention relates generally to a method and apparatus for providing Digital Rights Management (DRM) service over a network, and more particularly, to a method and apparatus for providing DRM in which registration information corresponds to a user account depending on a DRM solution.

2. Description of the Related Art

In conventional digital content, such as digitalized e-Books, audios and videos, digital works may be provided without deformation or quality degradation, even when the digital content is copied many times or is remotely transmitted and received. Therefore, with the rapid development of the wired/wireless communication networks and the popularization of personal computer devices and various mobile/stationary multimedia devices, the digital content may be often illegally replicated and distributed, and/or transmitted/received without the permission the author.

Digital Rights Management (DRM) technology is a typical example of the digital security technology for restricting the unauthorized replication and distribution of digital content. The DRM technology is a technology for securely managing and protecting digital content, and as well as for controlling the use of digital content depending on the authorization information throughout the whole distribution process from the creation to the use of digital content.

Service operators and content providers typically use their own different DRM technologies to provide digital content. Therefore, various DRM systems that are not interoperable with each other exist, and some of each of these DRM systems can only be supported and managed by the corresponding service operator and/or content provider (hereinafter, referred to as a 'service operator' in common) that use the related DRM solution. This arrangement causes operational restrictions. More specifically, the coexisting plurality of DRM systems using different DRM solutions causes market fragmentation in the digital content market, which makes it difficult to manage the DRM systems.

SUMMARY OF THE INVENTION

Accordingly, the present invention is provided to address the above-described problems and provide at least the advantages described below. An aspect of the present invention is to provide a cloud-based DRM service provisioning method and apparatus for facilitating the management of multiple DRM systems, and a system thereof.

In accordance with an aspect of the present invention, a method for providing a Digital Rights Management (DRM) service in a network is provided. The method includes receiving a request message for device registration, which includes DRM-related identification information, from a user device; and registering registration information of the user device based on the DRM-related identification information, the user device being distinguished according to a DRM solution, the registration information being registered to correspond to a user account.

In accordance with another aspect of the present invention, a service operator apparatus for providing a Digital Rights Management (DRM) service in a network is provided. The service operator apparatus includes a service portal for receiving, from a user device, a request message for device registration, the request message including DRM-related identification information; and a user account registry for registering registration information of the user device based on the DRM-related identification information delivered from the service portal, the user device being distinguished according to a DRM solution, the registration information being registered to correspond to a user account.

In accordance with further another aspect of the present invention, a method for providing a Digital Rights Management (DRM) service in a network is provided. The method includes receiving, from a user device having an authorization token for device registration related to DRM, a request message for device registration, the request message including the authorization token; and recording, based on the received authorization token, registration information including information about a DRM solution that the user device intends to use.

In accordance with yet another aspect of the present invention, a Digital Rights Management (DRM) operator apparatus for providing a DRM service in a network is provided. The DRM operator apparatus includes a DRM system controller for receiving, from a user device having an authorization token for device registration related to DRM, a request message for device registration, such that the request message includes the authorization token, and recording, based on the received authorization token, registration information including information about a DRM solution that the user device intends to use.

In accordance with still another aspect of the present invention, a method for providing a Digital Rights Management (DRM) service in a network is provided. The method includes receiving, from a user device, by a service operator providing digital content to the user device, a message for requesting a license for use of the DRM service; checking, by the service operator, DRM-related registration information of the user device and transferring an authorization token for the license to the user device; receiving, from the user device, by a DRM operator that hosts a plurality of DRM schemes, a license request message including the authorization token; and performing, by the DRM operator upon receiving the license request message, a DRM-specific procedure for providing the license by communicating with the user device.

In accordance with still another aspect of the present invention, a system for providing a Digital Rights Management (DRM) service in a network is provided. The system includes a service operator for providing digital content, and upon receiving, from a user device, a message for requesting a license for use of the DRM service, checking DRM-related registration information of the user device and transferring, to the user device, an authorization token for the license; and a DRM operator for hosting a plurality of DRM schemes, and upon receiving a license request message including the authorization token from the user device, performing DRM-specific procedure for provisioning of the license by communicating with the user device.

In accordance with still another aspect of the present invention, a method for receiving a Digital Rights Management (DRM) service by a user device in a network is provided. The method includes sending, to a service operator that recorded DRM-related registration information of the user device, a message for requesting a license for use of the DRM service; receiving, from the service operator that checked the DRM-related registration information, an authorization token for the license; sending, to a DRM operator that hosts a plurality of DRM schemes, a message including the authorization token for the license; and performing a DRM-specific procedure for provisioning of the license by communicating with the DRM operator that has received the authorization token for the license.

In accordance with still another aspect of the present invention, a user device for receiving a Digital Rights Management (DRM) service in a network is provided. The user device includes a service client for sending, to a service operator that recorded DRM-related registration information of the user device, a message for requesting a license for use of the DRM service, receiving, from the service operator that checked the DRM-related registration information, an authorization token for the license, and sending, to a DRM operator that hosts a plurality of DRM schemes, a message including the authorization token for the license; and a DRM client for performing a DRM-specific procedure for providing the license by communicating with the DRM operator that has received the authorization token for the license.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Embodiments of the present invention are described as follows in detail with reference to the accompanying drawings. In the following description, specific details such as detailed configuration and components are merely provided to assist the overall understanding of embodiments of the present invention. Therefore, various changes and modifications of the embodiments described herein can be made without departing from the scope and spirit of the invention. In addition, descriptions of well-known functions and constructions are omitted for clarity and conciseness. Throughout the drawings, the same drawing reference numerals may be used to refer to the same or similar elements, features, and structures.

An embodiment of the present invention provides a method and apparatus for accessing a cloud-based DRM infrastructure. More specifically, this embodiment provides a method and apparatus for registering user devices in a service operator providing digital content to the user devices, regardless of their protection schemes, and authorizing the user devices to be registered in a cloud DRM operator.

Another embodiment of the present invention provides a method and apparatus for allowing a user device to acquire a license in a cloud-based DRM infrastructure and allowing the acquired license to be reused among the user devices having the same license. In this embodiment of the present invention, the user devices use authorization tokens designed for operation management in the cloud-based DRM infrastructure.

Another embodiment of the present invention provides a solution to extending content offering to a wide range of user devices regardless of their protection schemes like DRM, making it possible to provide a license for facilitating content consumption among multiple user devices having the same user account.

Figure 1:
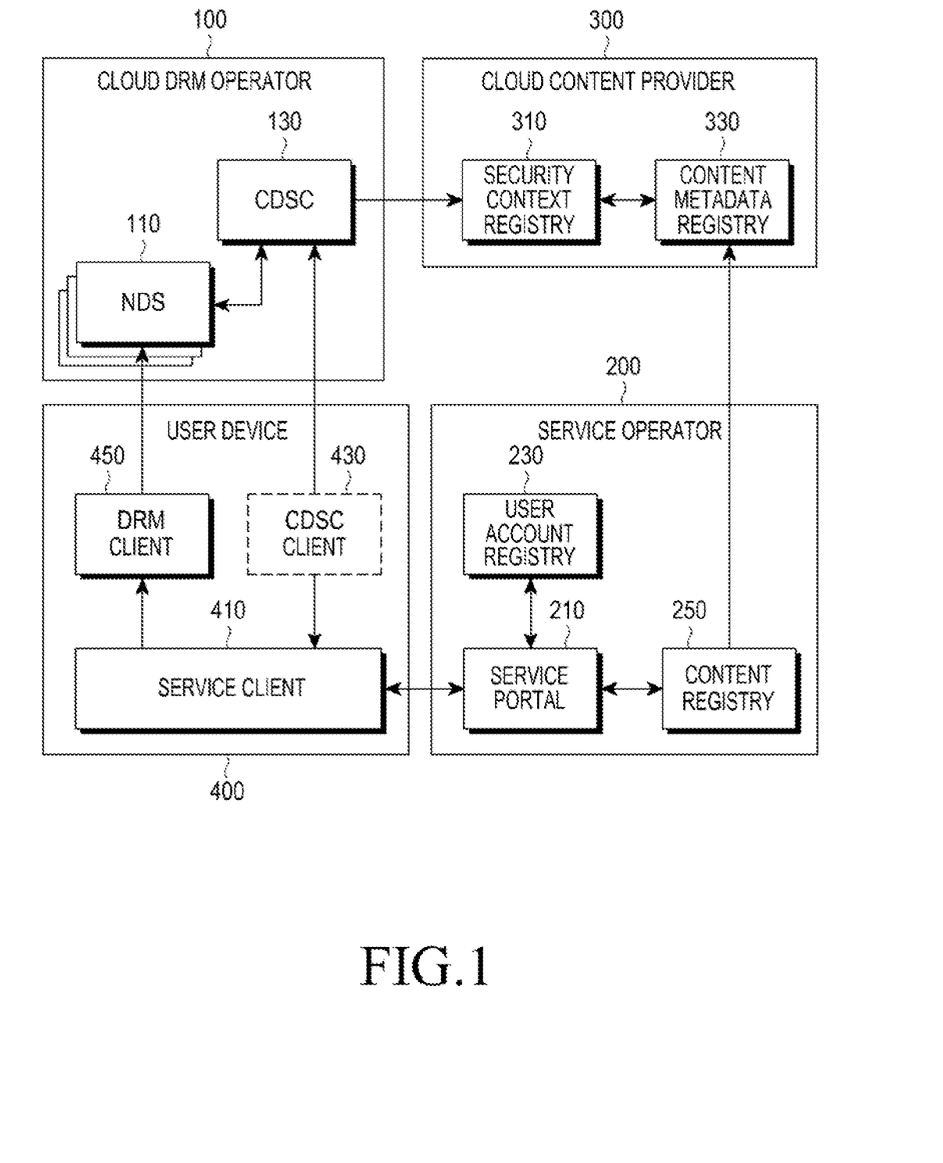
FIG. 1 is a block diagram illustrating a configuration of a cloud-based DRM system according to an embodiment of the present invention.

FIG. 1 is a block diagram illustrating a configuration of a cloud-based DRM system according to an embodiment of the present invention.

The DRM system shown in FIG. 1 includes a cloud DRM operator 100, a service operator 200, a cloud content provider 300, and a user device 400.

Referring to FIG. 1, the cloud DRM operator 100 supports a plurality of DRM schemes and includes at least one Native DRM Server (NDS) 110 for each DRM scheme, such that each NDS provides support to host its corresponding DRM scheme. The NDS 110 may be, for example, an Open Mobile Alliance (OMA) DRM server, a Marlin DRM server, a Windows Media (WM) DRM server, etc., as a DRM solution.

The NDS 110 creates a native DRM domain for the user device 400 that uses the related DRM scheme, and the NDS 110 is controlled by a Cloud DRM System Controller (CDSC) 130 that manages keys to device domains and content. The NDS 110 creates a native DRM domain for each DRM scheme according to an instruction of the CDSC 130.

Referring to FIG. 1, for its supportable DRM solution, the service operator 200 provides a DRM solution service through the cloud DRM operator 100. For example, the service operator 200 may operate separately from, or along with, the cloud DRM operator 100. The service operator 200 manages user accounts, joining in content/services, and registration of the user device 400.

The service operator 200 includes a service portal 210 that includes a portal site entity, which provides content/services to users, and a user account registry 230 that includes an entity that manages user profile information, including various user information such as user's subscription information and purchase information for content/services. A user may register one or several of its own user devices 400 in a user account registered in the service operator 200. A plurality of user devices 400 registered in the same user account may share an access right to the service/content that the user has purchased from the service operator 200.

In the embodiment according to FIG. 1, the service/content provided by the service operator 200 is provided to the user device 400 via the service portal 210. The service portal 210 may include a set of assets and logics related to the service/content provided to the user. In the embodiment according to FIG. 1, update information of the service/ content updated by the cloud content provider 300 is provided to the user device 400 via a content registry 250 in the service operator 200.

The user device 400 includes a service client 410, a CDSC client 430, and a DRM client 450. The service client 410 is used for communication with the service portal 210 in the service operator 200 for use of the service/content desired by the user, and the service client 410 may use a standalone application or a browser used in, for example, a smart phone. When the service client 410 has a function corresponding to the CDSC client 430, the service client 410 may communicate with the CDSC 130 of the cloud DRM operator 100 depending on the permission granted by the service operator 200.

Specifically, the CDSC client 430 is used for communication between the user device 400 and the CDSC 130, and may be optionally included in the user device 400 depending on the implementation type of the service client 410. The DRM client 450 is used for the DRM solution. The user device 400 in the present example includes one DRM client 450 supporting the DRM solution. However, if the user device 400 supports a plurality of DRM solutions, the user device 400 may include a plurality of DRM clients 450 supporting the plurality of DRM solutions in accordance with embodiments of the present invention.

In order to provide the service/content, the cloud content provider 300 is responsible for generation and maintenance of metadata of the service/content, as well as key information for use of the service/content. The cloud content provider 300 performing the above function may be implemented by including a security context registry 310 and a content metadata registry 330. The security context registry 310 is responsible for generation and maintenance of service/content information, and key information for use of the service/content, and the content metadata registry 330 is responsible for generation and maintenance of metadata of the service/content. If an entity (not shown) that is responsible for the service/content information, the key information, and the metadata of the service/content is implemented in the service operator 200, the cloud content provider 300 may provide related update information to the service operator 200. In the system configuration of FIG. 1, the internal components of the cloud DRM operator 100, the service operator 200, and the client content provider 300 may each be implemented as at least one server.

Figure 2:
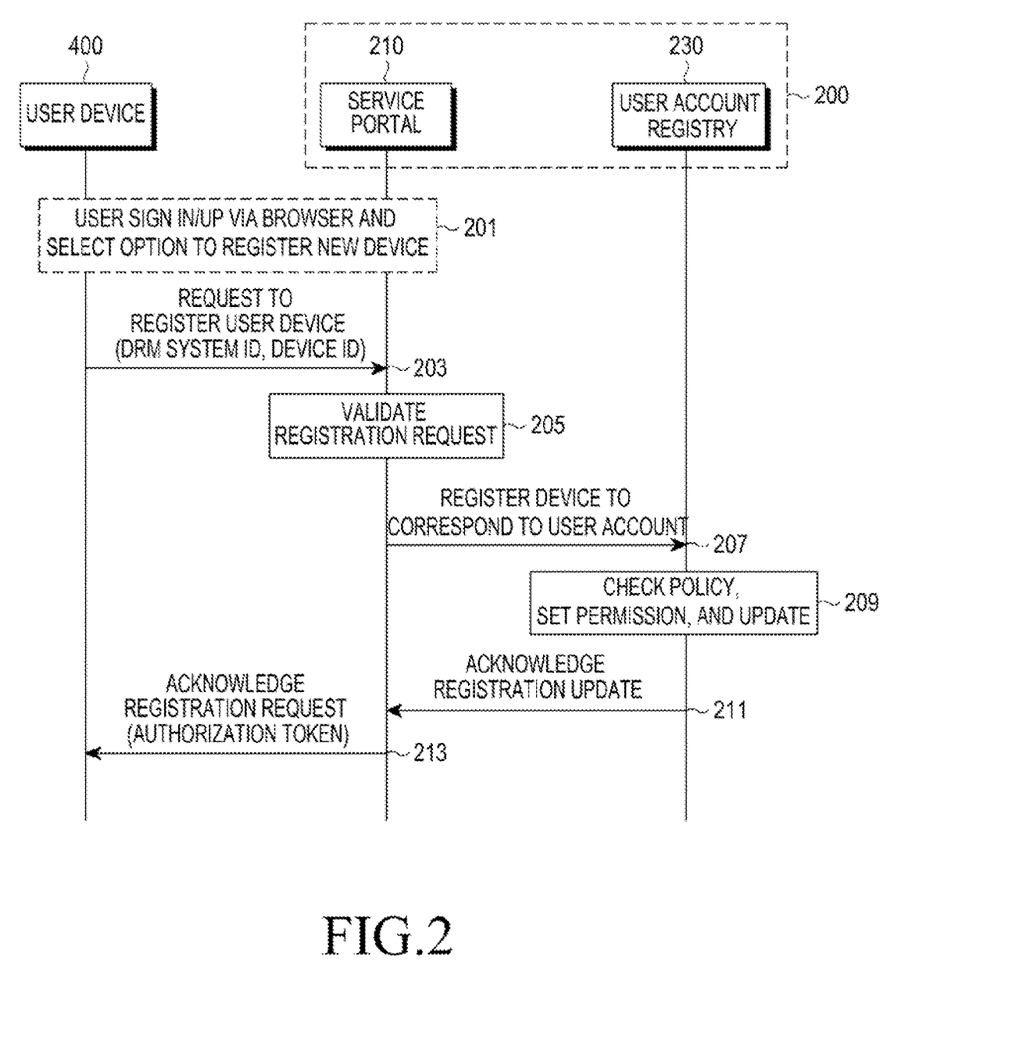
FIG. 2 is a flow diagram illustrating a procedure for registering a user device in a service operator according to an embodiment of the present invention.

FIG. 2 is a flow diagram illustrating a procedure for registering a user device in a service operator according to an embodiment of the present invention.

The registration procedure of FIG. 2 is performed between the user device 400 and the service operator 200. The service client 410 in the user device 400 and the service portal 210 and the user account registry 230 in the service operator 200 are involved in the registration procedure.

Referring to FIG. 2, in step 201, the user device 400 accesses the service operator 200 using a predetermined user account (or a currently-input user account), and provides various input information for device registration for the user device 400 to the service operator 200. The service portal 210 of the service operator 200 receives a user account on an input screen such as a web screen, provided to the user device 400, and receives a variety of option information for requesting registration of the user device 400. The reception of option information may be omitted.

In step 203, the user device 400 sends a request message including registration information for device registration to the service portal 210. The registration information includes a DRM-specific device IDentifier (ID) and a DRM system ID related to the DRM solution used by the user device 400. The DRM-specific device ID is a device ID used to identify a DRM solution, such as OMA DRM, Marlin DRM and WM DRM. The DRM system ID represents a DRM solution used in the user device 400. The registration information may also include service/content-specific metadata.

The service portal 210 verifies, in step 205, whether the request message including registration information is valid, and requests device registration for the user device 400 to correspond to the user account from the user account registry 230 for update of the device registration in step 207. In step 209, the user account registry 230 requests user profile information of the user to determine whether a right to newly or additionally register the user device 400 in the user account is granted. The number of user devices 400 that can be registered in one user account may be limited to a predetermined number. Upon a determination that the right to register the user device 400 is granted, the user account registry 230 newly or additionally registers the user device 400 in the user account, and then updates the registration information of the user account. The registration information is information obtained by registering information about a plurality of user devices in one user account, and the plurality of user devices may be distinguished according to their respective DRM solutions. Also, the plurality of user devices may be managed by being assigned the same device group ID.

Thereafter, in step 211, the user account registry 230 sends an acknowledgement message indicating the update of registration information for the user device 400, to the service portal 210. The acknowledgement message may include, for example, the device group ID, and the device group ID may be provided in the form of updated metadata. In step 213, upon receiving the acknowledgement message, the service portal 210 sends an acknowledgement message indicating the completion of device registration in the service operator 200, to the user device 400, together with an authorization for device registration in the cloud DRM operator 100. In step 213, the authorization is provided to the user device 400 in the form of an authorization token as defined in Table 1 below.

Table 1 shows an example of a structure of an authorization token for device registration in the cloud DRM operator 100 according to an embodiment of the present invention.

TABLE 1

| Field | M/O | Description |
| --- | --- | --- |
| Token type | M | Specifies type of this authorization token. This field should be set to "registration token". |
| Issuer ID | M | Identifier of Service Operator 200 that issued this authorization token. |
| Primary Client ID | M | Primary identifier of the connecting client. It is generated by the Service Operator 200 and bound to user account. Primary Client ID identifies all user devices under user account. It should not be the same as User Account ID. |
| Secondary Client ID | O | Secondary identifier of the connecting client. It is generated by the Service Operator 200 per principal user request. Secondary Client ID identifies sub-groups of user devices registered under user account. |
| CDO ID | M | Public verifiable identifier of the Cloud DRM Operator. |
| CDO URLs | M | One or more of the URLs listed below: URL of the CDSC where this token is to be presented. Download URL of the CDSC client application (if needed). |

TABLE 1-continued

| Field | M/O | Description |
|---|---|---|
| Registration policy | O | Registration policy such as registration deadline, service period, etc. |
| Target DRM | M | Identifies DRM solution implemented in the client device 400. |
| Device ID | M | DRM-specific device identifier. |
| Authorization Code | M | Issuer's signature over the contents of this authorization token. |

In Table 1, the connecting client may correspond to a user account. A set of user devices may be registered under one user account. In the secondary client ID, user devices recorded in a sub group may use the same or different DRM solutions, and a plurality of secondary client IDs may exist under one user account.

Figure 3:
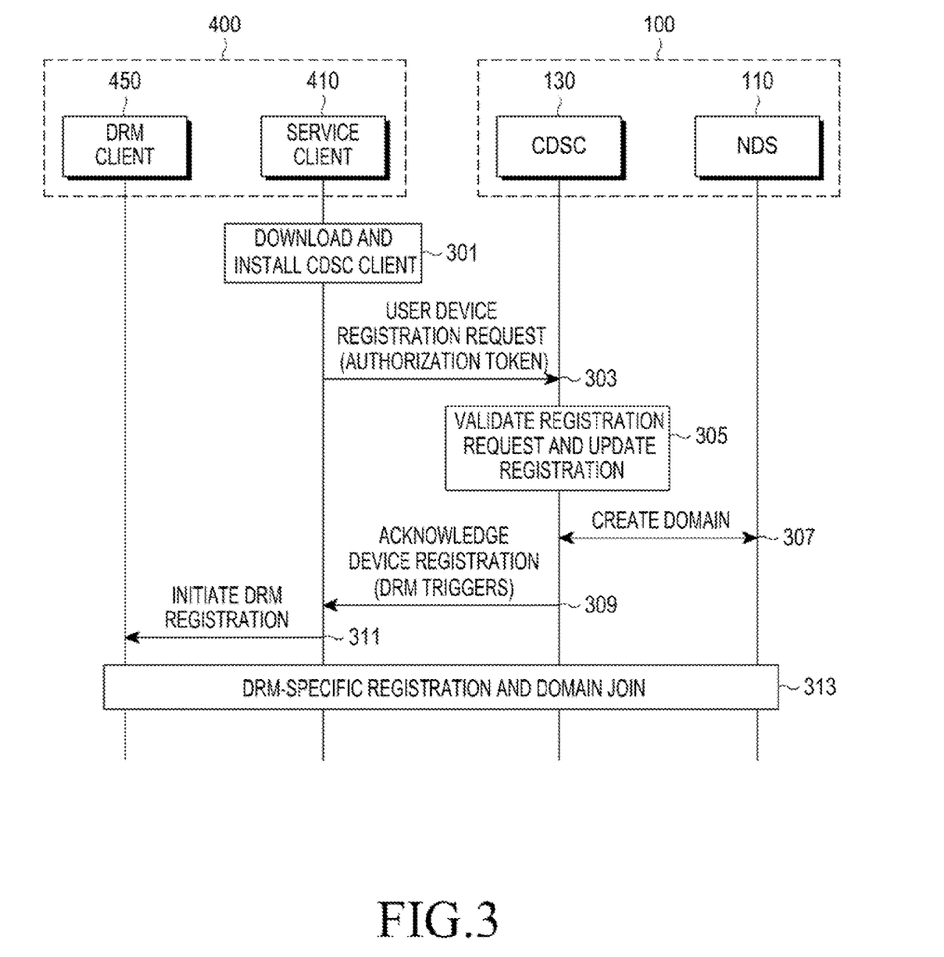
FIG. 3 is a flow diagram illustrating a procedure for registering a user device in a cloud DRM operator according to an embodiment of the present invention.

FIG. 3 is a flow diagram illustrating a procedure for registering a user device in a cloud DRM operator according to an embodiment of the present invention.

The registration procedure shown in FIG. 3 is performed between the user device 400 and the client DRM operator 100, and the service client 410 and the DRM client 450 in the user device 400 and the NDS 110 and the CDSC 130 in the cloud DRM operator 100 are involved in the registration procedure of FIG. 3.

In FIG. 3, it will be assumed that the user device 400 has received the authorization token in Table 1 for device registration in the cloud DRM operator 100, from the service operator 200 in accordance with the procedure of FIG. 2.

Referring to FIG. 3, the user device 400 determines, in step 301, whether a Uniform Resource Locator (URL) for downloading a CDSC client is included among Cloud DRM Operator (CDO) URLs, which are described in Table 1 in the authorization token received from the service operator 200. If a URL for downloading the CDSC client is included in the CDO URLs, the service client 410 downloads a CDSC client application using the URL for download and installs the downloaded CDSC client application. Thereafter, if the CDSC client application is installed, the user device 400 includes the CDSC client 430. The CDSC client 430 may be included in the service client 410, and in this embodiment of the present invention, the service client 410 is assumed to include the CDSC client 430.

In step 303, the service client 410 of the user device 400 requests, from the CDSC 130 of the cloud DRM operator 100, device registration for the user device 400. A request message for device registration, which is sent from the service client 410 to the CDSC 130, includes the authorization token of Table 1, and the authorization token may be a 'registration token' for device registration in the cloud DRM operator 100.

In step 305, the CDSC 130 of the cloud DRM operator 100 determines an authorization code and a registration policy in the authorization token included in the registration request message of step 303 to verify whether the authorization token is valid. If the authorization token is valid, the CDSC 130 updates registration information of the user device 400 in the following 'registration information update' method. In accordance with the registration information update, the CDSC 130, instructs, if necessary, the NDS 110 to create a domain corresponding to the target DRM in step 307. The target DRM refers to a DRM solution used in the user device 400. A registration information update procedure is described in more detail as follows.

Registration Information Update

1) The CDSC 130 determines whether the primary client ID included in the authorization token exists in the existing registration information. If the primary client ID not exists, the CDSC 130 newly generates a record of registration information for the primary client ID.

2) The CDSC 130 determines whether a secondary client ID exists in the authorization token. If the secondary client ID exits, the CDSC 130 determines whether the secondary client ID exists under the primary client ID in the existing registration information, and if the secondary client ID does not exist under the primary client ID, the CDSC 130 updates the record of registration information, so that the secondary client ID exists under the primary client ID.

3) If registration information is updated with the record of a new primary client ID through the operations 1) and 2) listed above, the CDSC 130 instructs the NDS 110 corresponding to the target DRM to create a new NDS (or a super domain), and records a super domain context of the new NDS under the primary client ID in the registration information. However, if no secondary client ID exists in the authorization token, the CDSC 130 records a device context (i.e., a 'Device ID' in Table 1) for the user device 400 in registration information together with the super domain context. If the primary client ID already exists in the existing registration information, an additional super domain may be created to support the target DRM.

4) If the existing registration information is updated by recording a new secondary client ID through the operations 1) to 3) listed above, the CDSC 130 instructs the NDS 100 to create another NDS corresponding to the target DRM. In this case, the domain context is recorded under the secondary client ID by the CDSC 130. If the secondary client ID already exists in the existing registration information, an additional domain may be created to support the target DRM.

Turning back to FIG. 3, after updating the registration information and, if needed, creating a domain corresponding to the target DRM by instructing the NDS 110, the CDSC 130 sends an acknowledgement message indicating the device registration results to the service device 400 in step 309. The acknowledgement message includes at least one of NDS information and DRM triggers (i.e., device registration and domain join triggers) corresponding to the target DRM of the user device 400.

Upon receiving the acknowledgement message, the service client 410 of the service device 400 instructs the DRM client 450 to initiate DRM registration in step 311. In step 313, the DRM client 450 performs DRM-specific registration and domain joining by communicating with the cloud DRM operator 100 according to the instruction from the service client 410, so that the desired DRM solution is operated in the user device 400. Domain joining is a procedure of the DRM client 450 for performing registration in a native DRM domain. Step 313 may be performed by the NDS 110 of the cloud DRM operator 100.

Table 2 below shows an example of a structure of registration information recorded in association with a user account according to an embodiment of the present invention.

TABLE 2

| Primary client ID | Primary client context | Device context (1 . . . n) |
|---|---|---|
| | | Super domain context (1 . . . m) |
| | Secondary client ID #1 | Device context (1 . . . n) |
| | | Domain context (1 . . . l) |

TABLE 2-continued

| | |
|---|---|
| Secondary client ID #2 | Device context (1 ... n) |
| | Domain context (1 ... k) |
| Other secondary client IDs (If needed) | . |
| | . |
| | . |

Figure 4:
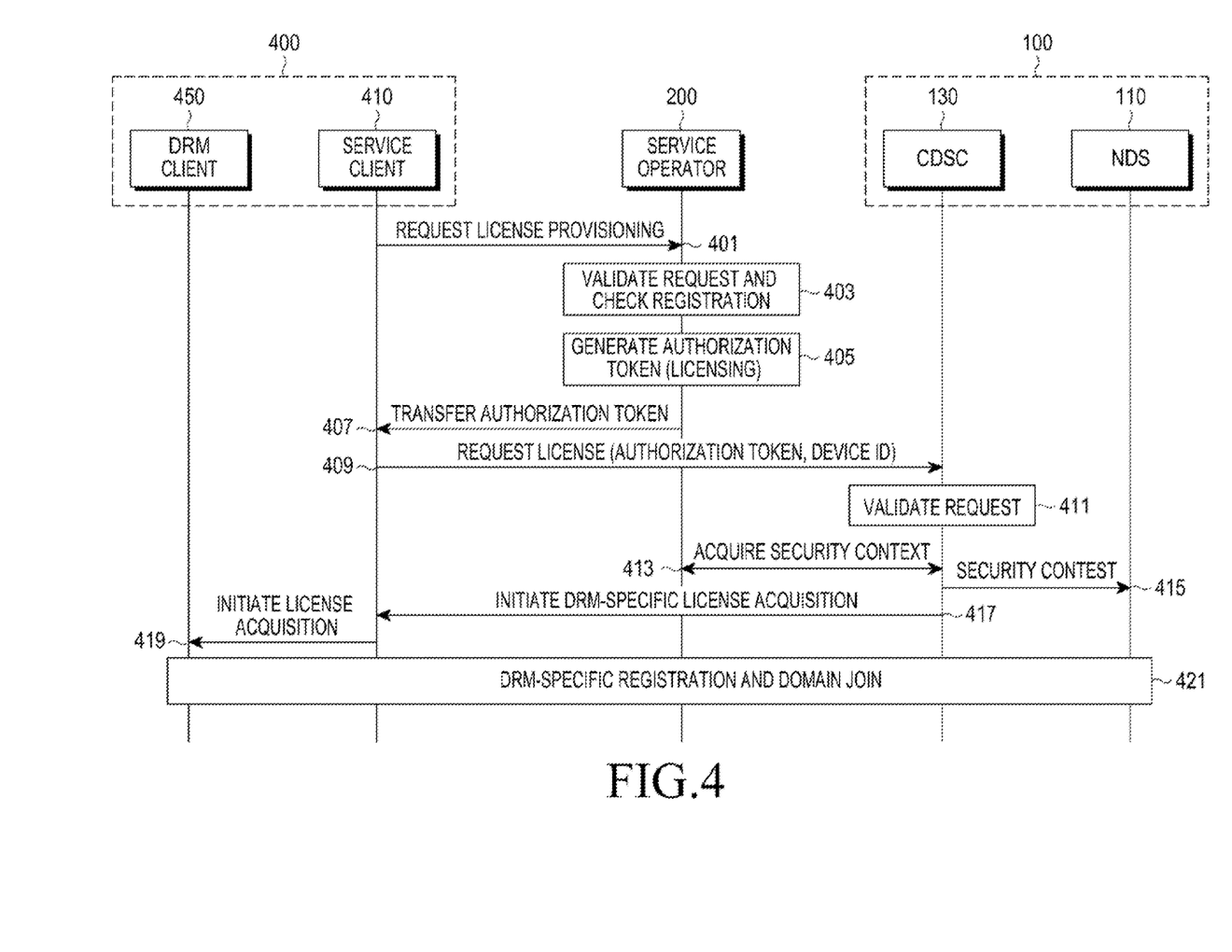
FIG. 4 is a flow diagram illustrating a procedure for providing a license to a user device in a cloud environment according to an embodiment of the present invention.

FIG. 4 is a flow diagram illustrating a procedure for providing a license to a user device in a cloud environment according to an embodiment of the present invention.

The license providing procedure of FIG. 4 is performed among the user device 400, the service operator 200, and the cloud DRM operator 100. The license providing procedure is performed under the assumption that a user has already purchased a content offering, that a record related to the purchase exists in registration information of a user account, and that the cloud DRM operator 100 are able to search for a security context from the cloud content provider 300 or the service operator 200.

Referring to FIG. 4, in step 401, the service client 410 in the user device 400 sends a license provisioning request to the service portal 210 in the service operator 200. In step 403, the service portal 210 verifies the license provisioning request, and requests registration information corresponding to the user account to determine whether there is a record for license provisioning.

Upon a determination in step 403 that information for providing the license exists in the registration information, in steps 405 and 407, the service operator 200 generates an authorization token for a license, and transfers the authorization token to the user device 400. Thereafter, in step 409, the service client 410 sends a license request message including the authorization token for a license, received from the service operator 200, and a device ID of the user device 400, to the cloud DRM operator 100.

In step 411, the CDSC 130 of the cloud DRM operator 100 checks an authorization code and a licensing policy included in the authorization token for a license, and verifies the authorization token. The CDSC 130 determines whether a device ID included in the license request message exists in a record of a primary client ID or a secondary client ID in registration information managed by the CDSC 130 itself. If the device ID does not exist, the CDSC 130, although not shown in FIG. 4, may notify the service device 400 of the need for registration or domain joining for the service device 400 according to the following operations:

1) The service operator 200 may include a new secondary client ID (unknown to the CDSC 130) in an authorization token. In this case, the CDSC 130 may generate a record for a new secondary client ID under the record of the primary client ID.
2) The user device 400 may be a member of a single group of user devices belonging to the secondary client ID. In this case, the device ID of the user device 400 must to be placed under a new secondary client ID by being removed from the previous record, because the device ID already exists under the secondary client ID that was recorded in registration information in advance. The DRM-specific procedures for domain joining and domain leaving are performed in the background.

Referring back to FIG. 4, if the validation performed in step 411 is successful, the CDSC 130 acquires a security context for content from the cloud content provider 300 or the service operator 200 using a security context registration URL included in the authorization token (hereinafter referred to as a 'license token') for a license in step 413. The security context is identified by an asset ID field of the license token. Although not shown in FIG. 4, the license token is delivered to the cloud content provider 300 by the CDSC 130.

In step 415, the CDSC 130 delivers the security context to a proper NDS 110 to generate the requested license. The NDS 110 may provide a native domain license for the user device 400 based on the device membership. For example, if the user device 400 is a member of some native domains, the CDSC 130 may notify a specific domain context to the NDS 110.

Thereafter, in step 417, the CDSC 130 or the NDS 110 triggers license provisioning by transmitting a DRM trigger to the service client 410 or the DRM client 450 in the user device 400. Upon receiving the trigger in step 417, the service client 410 delivers the received trigger to the DRM client 450 in step 419. The trigger may be replaced with a simple authorization acknowledgement to the service client 410. When a simple authorization acknowledgement is used, the DRM client 450 may spontaneously initiate license acquisition. Thereafter, in step 421, the DRM client 450 starts DRM-specific procedures for license provisioning. The user device 400 may use the primary and secondary client IDs in authorization tokens defined as Table 1 or Tables 3 to 5 below, to determine whether the user device itself is eligible for registration or license acquisition.

Various different structures of the authorization token for license request according to embodiments of the present invention are described below.

Table 3 shows an example of an authorization token (Type 1) for license request according to an embodiment of the present invention.

TABLE 3

| Field | M/O | Description |
|---|---|---|
| Token type | M | Specifies type of this authorization token. This field should be set to "registration token". |
| Issuer ID | M | Identifier of Service Operator 200 that issued this authorization token. |
| Primary Client ID | M | Primary identifier of the connecting client (same as in "registration token"). |
| Secondary Client ID | O | Secondary identifier of the connecting client. If this field is present, CDSC 130 should only allow license provisioning in the associated domain. |
| Asset ID | M | Identifies content purchased by the user for which license is to be acquired. |
| CDO ID | M | Public verifiable identifier of the Cloud DRM Operator 100. |
| CDO URL | O | URL of the CDSC 130 where this token is to be presented. |
| Security Context Registry URL | O | URL of the entity that provides security context for license generation, in case it is different from Service Operator 200 (e.g. Cloud Content Provider 300). |
| Licensing policy | O | Licensing policy such as licensing deadline, etc. |
| Device ID | O | DRM-specific device identifier. This field may be used to instruct CDSC 130 to provide license to this particular device only (outside of any domain). |
| Authorization Code | M | Issuer's signature over the contents of this authorization token. |

The authorization token based on Type 1 of Table 3 may be transmitted between user devices. An eligible user device registered in the cloud DRM operator 100 may use the authorization token of Table 3 in requesting and receiving a license for the content that the user has purchased. The user device 400 may store the authorization token locally for a desired period of time. The user device 400 may also use data from the licensing policy field to manage storing of the authorization tokens. The authorization token of Table 3 may also be re-acquired from the service operator 200.

Table 4 below shows another example of an authorization token (Type 2) for license request according to an embodiment of the present invention.

TABLE 4

| Field | M/O | Description |
|---|---|---|
| Token type | M | Specifies type of this authorization token. This field should be set to "primary licensing token". |
| Issuer ID | M | Identifier of Service Operator 200 that issued this authorization token. |
| Primary Client ID | M | Primary identifier of the connecting client (same as in "registration token"). |
| Secondary Client ID | O | Secondary identifier of the connecting client. If this field is present, CDSC 130 should only allow license provisioning in the associated domain. |
| Asset ID | M | Identifies content purchased by the user for which license is to be acquired. |
| CDO ID | O | Public verifiable identifier of the Cloud DRM Operator 100. |
| CDO URL | O | URL of the CDSC 130 where this token is to be presented. |
| Licensing policy | O | Licensing policy such as licensing deadline, etc. |
| Device ID | O | DRM-specific device identifier. This field may be used to instruct CDSC 130 to provide license to this particular device only (outside of any domain). |
| Token ID | M | Identifier of this token. |
| Security Context | M | Security context for the content purchased, such as encrypted content keys, encryption metadata, content usage rules, etc |
| Authorization Code | M | Issuer's signature over the contents of this authorization token. |

The authorization token based on Type 2 of Table 4 cannot be transmitted between user devices. This authorization token may be used once by a first user device that acquires a related license from the cloud DRM operator 100. The cloud DRM operator 100 is required to store the authorization token as specified in the licensing policy field. The authorization token based on Type 2 must be removed from the user device 400 after its license is acquired. However, the user device (or the CDSC client) must cache the device ID and the token ID so that the user device (or the CDSC client) may request the license again, and may also cache the primary client ID. The Type 2 authorization token is not re-acquired from the service operator 200, but it is replaced by a downloadable authorization token of Type 3. During license acquisition, the security context acquisition procedure may be omitted in step 413 of FIG. 4. Instead of performing step 413, the CDSC 130 extracts a security context from the authorization token based on Type 2.

Table 5 below shows another example of an authorization token (Type 3) for license request according to an embodiment of the present invention.

TABLE 5

| Field | M/O | Description |
|---|---|---|
| Token type | M | Specifies type of this authorization token. This field should be set to "secondary licensing token". |
| Issuer ID | M | Identifier of Service Operator 200 that issued this authorization token. |
| Primary Client ID | M | Primary identifier of the connecting client (same as in "registration token"). |

TABLE 5-continued

| Field | M/O | Description |
|---|---|---|
| Secondary Client ID | O | Secondary identifier of the connecting client. If this field is present, CDSC 130 should only allow license provisioning in the associated domain. |
| CDO ID | O | Public verifiable identifier of the Cloud DRM Operator 100. |
| CDO URL | O | URL of the CDSC 130 where this token is to be presented. |
| Licensing policy | O | Licensing policy such as licensing deadline, etc. |
| Device ID | O | DRM-specific device identifier. This field may be used to instruct CDSC 130 to provide license to this particular device only (outside of any domain). |
| Token ID | M | Identifier of this token. It should be same as in associated token of type 2 ("primary licensing token") |
| Authorization Code | M | Issuer's signature over the contents of this authorization token. |

The authorization token based on Type 3 of Table 5 may be locally stored and transmitted between user devices. The authorization token based on Type 3 is registered under a user account, and may be acquired from the service operator 200 by all user devices that are eligible to obtain an access to the token. The service client 410 may use primary and secondary client IDs to determine whether the user device is eligible to acquire the license. In this case, while the license is being provided, the same procedure of FIG. 4 is performed as an operation of using the primary licensing token, except that the licensing token (secondary licensing token) is transmitted in step 409.

Figure 5:
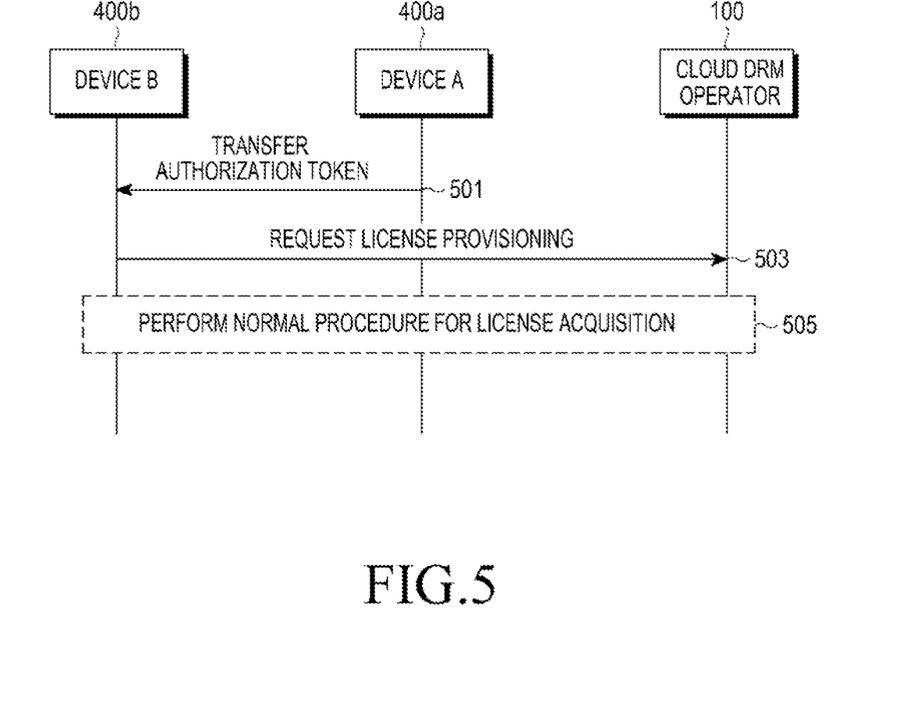
FIG. 5 is a flow diagram illustrating a super distribution procedure for an authorization token according to an embodiment of the present invention.

FIG. 5 is a flow diagram illustrating a super distribution procedure for an authorization token according to an embodiment of the present invention.

Referring to FIG. 5, a user device A 400a transfers an authorization token to a user device B 400b in step 501. Type 1 and Type 3 authorization tokens for requesting licenses request may be freely transmitted between all user devices. In step 503, upon receiving the authorization token, the user device B 400b requests license provisioning from the cloud DRM operator 100. Thereafter, in step 505, the procedure for license acquisition described herein with reference to FIG. 4 is performed. If a device ID is specified in the authorization token for license request, the authorization token may only be used in the user device having the specified device ID.

As is apparent from the foregoing description, according to embodiments of the present invention, a plurality of DRMs may coexist since a plurality of DRMs supported by service providers (i.e., service operators) of the network may be managed together. This DRM service provided by the present invention provides efficient services that can be accessed via a plurality of defined standard Application Program Interfaces (APIs).

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for providing a digital rights management (DRM) service in a network, comprising:
 receiving, from a user device, by a DRM operator server that supports a plurality of DRM solutions, a license request message including an authorization token for a license for a DRM solution used in the user device;

registering, by the DRM operator server, the user device to the DRM operator server, if the authorization token is valid;

generating, by the DRM operator server, the requested license;

transmitting, by the DRM operator server, an acknowledgement message including a result of the registering, to the user device;

performing DRM-specific registration and domain joining of the user device corresponding to the DRM solution used in the user device, according to the acknowledgement message; and providing, by the DRM operator server, the user device with the license, wherein the license provides access to secured content, wherein the authorization token includes one or more identifiers for identifying the user device among user devices that have been registered distinguishably in a user account according to a DRM solution used in each of the user devices, and wherein the one or more identifiers include:
a primary client identifier (ID) for identifying the user devices that have been registered in the user account in which the user device has been registered; and
a secondary client ID for identifying a sub group of the user devices that have been registered in the user account.

2. The method of claim 1, wherein the authorization token further includes at least one of an ID of a service operator server which generates the authorization token, an ID for identifying digital content purchased by the user, an authorization code for the content, a licensing policy, and a uniform resource locator (URL) of an entity that provides a security context for generation of the license.

3. The method of claim 1, further comprising acquiring, by the DRM operator server, a security context for the digital content, from a content provider or a service operator server which generates the authorization token, using a security context registration URL included in the license request message.

4. A digital rights management (DRM) operator server for providing a DRM service in a network, comprising:
a transceiver configured to communicate with an other network entity in the network and receive, from a user device, a license request message including an authorization token for a license for a DRM solution used in the user device; and
a hardware processor configured to:
support a plurality of DRM solutions,
validate the authorization token of the user device according to the DRM solution identified by one or more identifiers contained in the authorization token,
register the user device to the DRM operator server, if the authorization token is valid,
generate the request license,
control the transceiver to transmit an acknowledgement message including a result of the registering, to the user device, and
provide the user device with the license, wherein the license provides access to secured content,
wherein the authorization token includes one or more identifiers for identifying the user device among user devices that have been registered distinguishably in a user account according to a DRM solution used in each of the user devices, wherein the one or more identifiers include:
a primary client identifier (ID) for identifying the user devices that have been registered in the user account in which the user device has been registered; and
a secondary client ID for identifying a sub group of the user devices that have been registered in the user account, and
wherein the user device performs DRM-specific registration and domain joining of the user device corresponding to the DRM solution used in the user device, according to the acknowledgement message.

5. The DRM operator server of claim 4, wherein the authorization token further includes at least one of an ID of a service operator server which generates the authorization token, an ID for identifying digital content purchased by a user, an authorization code for the content, a licensing policy, and a uniform resource locator (URL) of an entity that provides a security context for generation of the license.

6. The DRM operator server of claim 4, wherein the hardware processor is configured to acquire a security context for the digital content, from a content provider or a service operator server which generates the authorization token, using a security context registration URL included in the license request message.

7. A method for supporting a digital rights management (DRM) service by a user device in a network, comprising:
transmitting, to a DRM operator server that supports a plurality of DRM solutions, a license request message including the authorization token for a license for a DRM solution used in the user device;
receiving, from the DRM operator server, an acknowledgement message which includes a result of registering of the user device to the DRM operator server, corresponding to the license request message;
performing DRM-specific registration and domain joining corresponding to the DRM solution used in the user device, according to the acknowledgement message; and
initiating acquisition of the license generated by the DRM operator server, wherein the license provides access to secured content,
wherein it is determined whether the authorization token of the user device is valid according to the DRM solution identified by one or more identifiers contained in the authorization token;
wherein the authorization token includes the one or more identifiers for identifying the user device among user devices that have been registered distinguishably in a user account according to a DRM solution used in each of the user devices, and
wherein the one or more identifiers include:
a primary client identifier (ID) for identifying the user devices that have been registered in the user account in which the user device has been registered; and
a secondary client ID for identifying a sub group of the user devices that have been registered in the user account.

8. The method of claim 7, further comprising:
receiving, from a service operator server, the authorization token for registration of the user device implementing the DRM solution,
wherein registering of the user device is performed by transferring the authorization token to the DRM operator server.

9. The method of claim 7, further comprising transferring, to at least one other user device, the authorization token for the license.

10. A user device for supporting a digital rights management (DRM) service in a network, comprising:
a transceiver configured to communicate with an other network entity in the network; and
a hardware processor configured to:
control the transceiver to transmit, to a DRM operator server that supports a plurality of DRM solutions, a license request message including an authorization token for a license for a DRM solution used in the user device,
control the transceiver to receive, from the DRM operator server, an acknowledgement message which includes a result of registering of the user device to the DRM operator server, corresponding to the license request message, if the authorization token is valid,
perform DRM-specific registration and domain joining corresponding to the DRM solution used in the user device, according to the acknowledgement message, and
initiate acquisition of the license generated by the DRM operator server, wherein the license provides access to secured content,
wherein it is determined whether the authorization token of the user device is valid according to the DRM solution identified by one or more identifiers contained in the authorization token;
wherein the authorization token includes the one or more identifiers for identifying the user device among user devices that have been registered distinguishably in a user account according to a DRM solution used in each of the user devices, and
wherein the one or more identifiers include:
a primary client identifier (ID) for identifying the user devices that have been registered in the user account in which the user device has been registered; and
a secondary client ID for identifying a sub group of the user devices that have been registered in the user account.

11. The user device of claim 10, wherein the user device is configured to receive, from a service operator server, the authorization token for registration of the user device implementing the DRM solution, and
wherein registering of the user device is performed by transferring, to the DRM operator server, the authorization token.

12. The user device of claim 10, wherein the user device is configured to transfer, to at least one other user device, the authorization token for the license.

* * * * *